US008707384B2

(12) United States Patent
Jain et al.

(10) Patent No.: US 8,707,384 B2
(45) Date of Patent: Apr. 22, 2014

(54) CHANGE RECOMMENDATIONS FOR COMPLIANCE POLICY ENFORCEMENT

(75) Inventors: Nitin Jain, Sunnyvale, CA (US); Amit Bhalla, Bangalore (IN); Sourav Mukherjee, South San Francisco, CA (US); Macks Ningombam, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1402 days.

(21) Appl. No.: 12/029,049

(22) Filed: Feb. 11, 2008

(65) Prior Publication Data

US 2009/0205011 A1 Aug. 13, 2009

(51) Int. Cl.
*G06F 17/00* (2006.01)
(52) U.S. Cl.
USPC ...... 726/1; 726/25; 726/27; 726/13; 713/190; 718/1
(58) Field of Classification Search
USPC .......... 726/1, 13, 25, 26, 27; 718/1; 709/203; 713/190
See application file for complete search history.

(56) References Cited

U.S. PATENT DOCUMENTS

| | | | | |
|---|---|---|---|---|
| 7,496,552 B2 * | 2/2009 | Huang et al. | ...... | 706/47 |
| 7,512,965 B1 * | 3/2009 | Amdur et al. | ...... | 726/1 |
| 7,603,358 B1 * | 10/2009 | Anderson et al. | ...... | 1/1 |
| 7,627,891 B2 * | 12/2009 | Williams et al. | ...... | 726/1 |
| 7,687,893 B2 * | 3/2010 | Smith | ...... | 257/676 |
| 7,725,737 B2 * | 5/2010 | Konanka et al. | ...... | 713/190 |
| 7,805,752 B2 * | 9/2010 | Newstadt et al. | ...... | 726/1 |
| 8,028,269 B2 * | 9/2011 | Bhatia et al. | ...... | 717/103 |
| 8,234,647 B1 * | 7/2012 | Chutinan et al. | ...... | 718/102 |
| 8,468,167 B2 * | 6/2013 | Sathyanarayana et al. | ... | 707/776 |
| 2003/0014654 A1 * | 1/2003 | Adler et al. | ...... | 713/200 |
| 2003/0065942 A1 | 4/2003 | Lineman | | |
| 2005/0209876 A1 * | 9/2005 | Kennis et al. | ...... | 705/1 |
| 2007/0005320 A1 * | 1/2007 | Vinberg et al. | ...... | 703/13 |
| 2008/0104661 A1 * | 5/2008 | Levin et al. | ...... | 726/1 |
| 2008/0134176 A1 * | 6/2008 | Fitzgerald et al. | ...... | 718/1 |
| 2008/0148346 A1 * | 6/2008 | Gill et al. | ...... | 726/1 |
| 2008/0222631 A1 * | 9/2008 | Bhatia et al. | ...... | 717/178 |
| 2008/0244071 A1 * | 10/2008 | Parupudi et al. | ...... | 709/226 |
| 2008/0244690 A1 * | 10/2008 | Kulkarni et al. | ...... | 726/1 |
| 2008/0271110 A1 * | 10/2008 | Graves et al. | ...... | 726/1 |
| 2008/0301757 A1 * | 12/2008 | Demarest et al. | ...... | 726/1 |
| 2012/0198368 A1 * | 8/2012 | Bornheimer et al. | ...... | 715/763 |

FOREIGN PATENT DOCUMENTS

WO 2007075850 A2 7/2007

OTHER PUBLICATIONS

A Erradi, WS_Policy based Monitoring of Composite Web Services, Nov. 2007, vol. 5, pp. 99-108.*

* cited by examiner

*Primary Examiner* — Cordelia Zecher
*Assistant Examiner* — Viral Lakhia
(74) *Attorney, Agent, or Firm* — Shun Yao; Park, Vaughan, Fleming & Dowler LLP

(57) ABSTRACT

Some embodiments of the present invention provide a system for maintaining a software system. During operation, the system obtains a compliance policy for the software system and monitors the software system for a violation of the compliance policy. If a violation is detected, the system generates a change recommendation associated with the violation using the compliance policy and provides the change recommendation to an administrator, so that the administrator can use the change recommendation to resolve the violation.

18 Claims, 4 Drawing Sheets

FIG. 2

CHANGE RECOMMENDATIONS FOR COMPLIANCE POLICY ENFORCEMENT

RELATED APPLICATION

The subject matter of this application is related to the subject matter in a co-pending non-provisional application by inventors Nitin Jain, Amit Bhalla, Sunil Vengalil, Anurag Singh, and Aawardhan Logandan and filed on the same day as the instant application entitled, "AUTOMATED COMPLIANCE POLICY ENFORCEMENT IN SOFTWARE SYSTEMS," having Ser. No. 12/029,059, and filing date Feb. 11, 2008.

BACKGROUND

1. Field

The present invention relates to compliance policies in software systems. More specifically, the present invention relates to a method and system for providing change recommendations to enforce a compliance policy for a software system.

2. Related Art

Computer systems which are maintained by an Information Technology (IT) department are subject to constant change. For example, as technology evolves, system vulnerabilities are often discovered and new system features are released. Consequently, computer systems may require frequent upgrades, patches, configuration changes, and/or other modifications. Moreover, a system administrator may have to ensure that his/her system complies with local regulatory policies, organization-specific policies, cross-vendor requirements, and/or other rules and regulations. For example, an organization-specific policy may require FTP ports to be closed on all systems within the organization to prevent data theft. Similarly, governmental regulations may specify requirements for auditing capabilities on software systems. To facilitate compliance with the various policies, the administrator may be responsible for collecting the policies and creating a set of configuration standards.

Various difficulties may arise in ensuring compliance with the configuration standards. First, software and hardware components may require constant monitoring to keep abreast of deviations from the system configuration standards. Moreover, policy violations are currently resolved by manual lookups to determine the necessary changes to enforce compliance. In addition, the configuration standards may change in content as well as number over time. Consequently, manual enforcement of the various configuration standards may become increasingly difficult as the configuration standards, system subcomponents, and the organization's needs evolve.

SUMMARY

Some embodiments of the present invention provide a system for maintaining a software system. During operation, the system obtains a compliance policy for the software system and monitors the software system for a violation of the compliance policy. If a violation is detected, the system generates a change recommendation associated with the violation using the compliance policy and provides the change recommendation to an administrator, so that the administrator can use the change recommendation to resolve the violation.

In some embodiments, the system also reevaluates the software system using the compliance policy. If the software system conforms to the compliance policy, the system clears the violation and clears the change recommendation.

In some embodiments, the software system is monitored by translating the compliance policy into a set of checks and running the checks on the software system.

In some embodiments, the compliance policy is user-authored.

In some embodiments, the violation is associated with a password reset, a security attack, a port, a configuration file, a software patch, an application type, an application version, or a standard.

In some embodiments, the change recommendation is provided to the administrator using a change recommendation user interface (UI).

In some embodiments, the software system is executed at a data center.

In some embodiments, the compliance policy comprises an Extensible Markup Language (XML) document.

BRIEF DESCRIPTION OF THE FIGURES

FIG. 2 shows an exemplary screenshot of a change recommendation user interface in accordance with an embodiment of the present invention.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention provide a method and apparatus for maintaining software systems. Software systems may correspond to standalone applications, application suites, operating systems, enterprise software solutions, databases, and/or other types of software. More specifically, embodiments of the invention provide a method and apparatus for facilitating the enforcement of a compliance policy for a software system. The compliance policy may include organizational regulations, cross-vendor requirements, local regulatory policies, and/or other compliance requirements for the software system.

In one or more embodiments of the invention, the compliance policy is user-authored. In addition, a configuration framework may be used to monitor the software system for violations of the compliance policy. If a violation is detected, the configuration framework may generate a change recommendation associated with the violation using the compliance policy. The configuration framework may also provide the change recommendation to an administrator of the software system, thus allowing the administrator to resolve the violation using the change recommendation. In one or more embodiments of the invention, a change recommendation user interface (UI) is used to provide change recommendations to the administrator.

Figure 1:
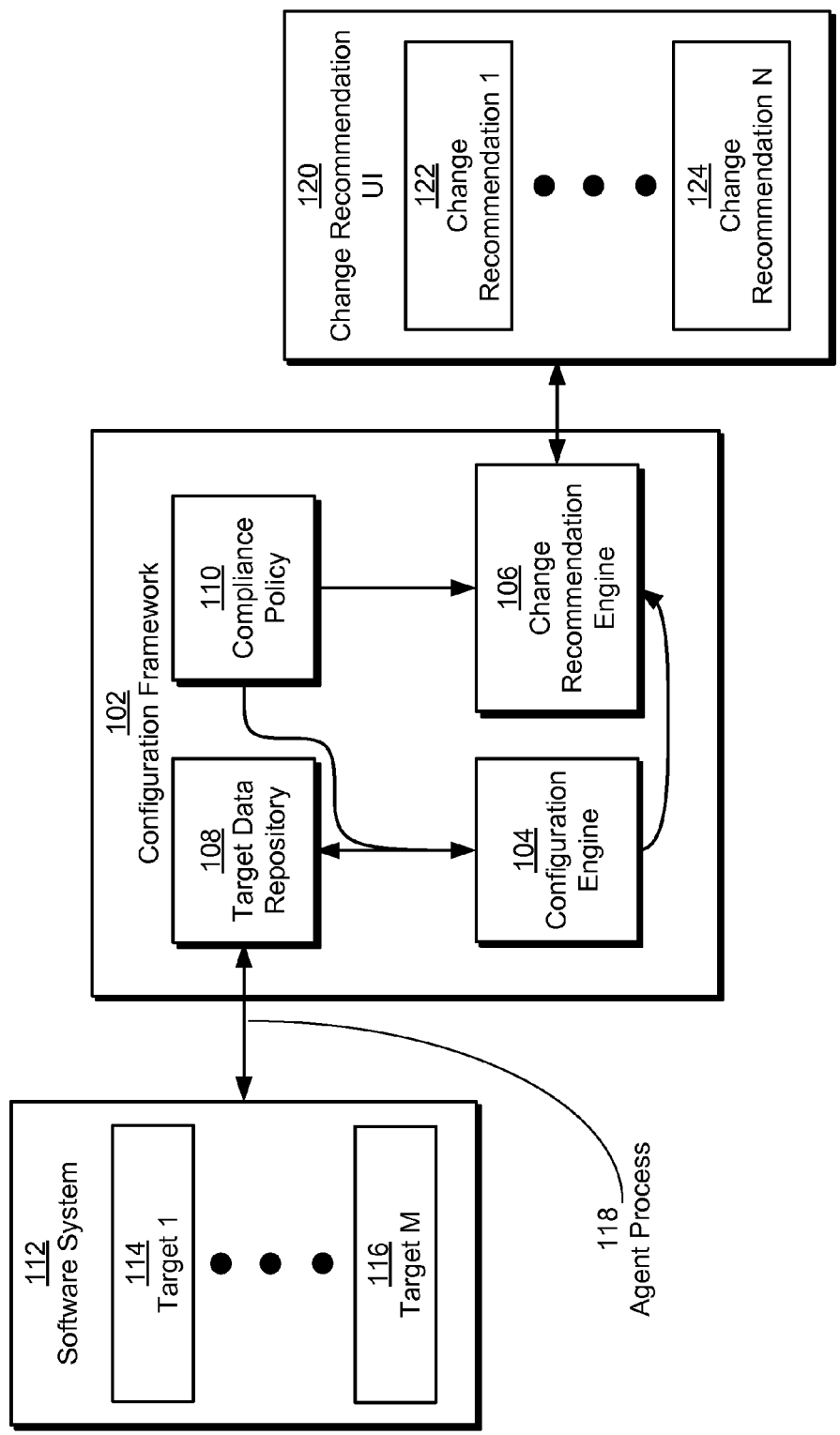
FIG. 1 shows a schematic of a system in accordance with an embodiment of the present invention.

FIG. 1 shows a schematic of a system in accordance with an embodiment of the present invention. The system is used to maintain a software system 112 and includes a change recommendation user interface (UI) 120 and a configuration framework 102. Configuration framework 102 includes a target data repository 108, a compliance policy 110, a configuration engine 104, and a change recommendation engine 108. Each of the components is described in further detail below.

Software system 112 may correspond to a standalone application, application suite, operating system, enterprise software solution, database, and/or other type of software. In addition, software system 112 may be executed in a variety of environments. For example, software system 112 may be executed on a single desktop computer or workstation, or software system 112 may be distributed across multiple servers within a data center.

As shown in FIG. 1, software system 112 includes multiple targets (e.g., target 1 114, target m 116). Each target may correspond to a component or subcomponent of software system 112. For example, an enterprise solution may include one or more targets corresponding databases, business logic layers, user interfaces, network configurations, middleware, and/or other parts of the enterprise solution. In other words, targets may refer to individual software modules that perform specific tasks within software system 112. In addition, the functionality of software system 112 may be produced by the interaction of the targets with one another. For example, a financial transaction application may include one or more databases for storing data related to financial accounts, financial transactions, and users; business logic and middleware for performing financial transactions; and a user interface to allow users to access and use the application.

Those skilled in the art will appreciate that software system 112 may be subject to a variety of organization-specific policies, local regulatory policies, cross-vendor requirements, and/or other rules and regulations. Requirements relevant to software system 112 may further be formulated into a set of configuration standards that are applied to software system 112. In one or more embodiments of the invention, the configuration standards include specific guidelines and parameters within which software system 112 must be kept to conform to the various rules and regulations required of the operation of software system 112. For example, requirements pertaining to software system 112 may be translated into configuration standards describing the opening and closing of ports, authentication and encryption mechanisms, configuration file parameter values, software patches, application compatibility, and/or other configuration aspects of software system 112.

In one or more embodiments of the invention, configuration standards from various rules and regulations are compiled into compliance policy 110. In addition, compliance policy 110 may be used by configuration framework 102 to monitor and maintain software system 112. As with software system 112, configuration framework 102 may be executed in various environments. For example, configuration framework 102 may be executed using the same machine(s) as software system 112, or configuration framework 102 may run on one or more hosts that communicate with software system 112 using a network connection.

In one or more embodiments of the invention, configuration framework 102 uses an agent process 118 to interface with software system 112. Specifically, agent process 118 may collect target information about the targets in software system 112. The target information may include data such as configuration file parameters, software patches, software types and versions, and/or other settings found on software system 112. In addition, the target information may be stored in target data repository 108 for use by configuration framework 102.

To monitor software system 112 for conformity to compliance policy 110, configuration engine 104 may compare target information in target data repository 108 with configuration standards in compliance policy 110. In one or more embodiments of the invention, the comparison is done by translating the configuration standards into a set of checks and running the checks on the target information and/or on software system 112. If a check fails, a violation is raised by configuration engine 104.

In one or more embodiments of the invention, compliance policy 110 is represented using an Extensible Markup Language (XML) document. The XML document may include tags and elements that specify and describe configuration standards, rules associated with each configuration standard, targets on which to apply the rules, tests that check for compliance to the configuration standards, and/or other information pertinent to enforcement of the compliance policy. The XML file may be parsed by configuration engine 104 to obtain relevant rules, tests, targets, and/or other information, which are then applied to the target information to determine conformity to the configuration standards within compliance policy 110. An example XML document for a configuration standard is shown below:

```
<?xml version="1.0" encoding="UTF-8"?>
<!-- drv: <standard type="create" /> -->
<std:Standard
xmlns:std="http://www.oracle.com/DataCenter/ConfigStd"
xmlns:xsi="http://www.w3.org/2001/XMLSchema-instance"
name="CriticalUpdatesStandard">
    <std:DisplayName>
        Oracle Critical Patch Update
    </std:DisplayName>
    <std:TargetType>host</std:TargetType>
    <std:Author>Oracle</std:Author>
    <std:Version>1</std:Version>
    <std:LifeCycleStatus>Production</std:LifeCycleStatus>
    <std:IsSystem>true</std:IsSystem>
    <std:Description>
        Ensures compliance to Critical Security recommendations
    </std:Description>
    <std:KeywordList>
        <std:Keyword>SECURITY_KEYWORD</std:Keyword>
    </std:KeywordList>
    <std:Body>
        <std:RuleFolder name="Critical Updates rules">
            <std:DisplayName>
                Critical Updates vulnerability rules
            </std:DisplayName>
            <std:Description>
                Evaluates security vulnerability on the hosts
            </std:Description>
            <std:Rule name="Critical Updates vulnerability rule">
                <std:DisplayName>
                    Critical Updates vulnerability rule
                </std:DisplayName>
                <std:Description>
                    Ensure that no host is vulnerable to any
```

```
            critical patch advisory
        </std:Description>
        <std:Rationale>
            Ensure that no host is vulnerable to any
            critical patch advisory
        </std:Rationale>
        <std:ChangeAdvisorTag>
            <std:Type>Oracle Recommendation</std:Type>
            <std:Subtype>Security</std:Subtype>
            <std:Reason>Critical Patch Update</std:Reason>
        </std:ChangeAdvisorTag>
        <std:ViolationContextList>
            <std:Column name="HostName">
                <std:DisplayLabel>
                Host Name
                </std:DisplayLabel>
                <std:IsKey>false</std:IsKey>
            </std:Column>
            <std:Column name="AdvisoryNames">
                <std:DisplayLabel>
                Advisory Names
                </std:DisplayLabel>
                <std:IsKey>false</std:IsKey>
            </std:Column>
        </std:ViolationContextList>
        <std:Test>
            select this.targetGuid as TARGET_GUID,
            this.targetName as HostName,
            CPF_CA.GET_ADVISORIES(this.targetName)
            as AdvisoryNames
            from this where 'true' =
            CPF_CA.VULNERABLE_HOST(this.targetName)
        </std:Test>
      </std:Rule>
    </std:RuleFolder>
  </std:Body>
</std:Standard>
```

As shown in the XML document, a configuration standard name of "CriticalUpdatesStandard" is used. In addition, the configuration standard includes a description of "Ensures compliance to Critical Security recommendations." The configuration standard also includes a rule to "Ensure that no host is vulnerable to any critical patch advisory." The rule further includes a test written in Structured Query Language (SQL), which may be used by configuration engine 104 to check for compliance to the rule.

In one or more embodiments of the invention, compliance policy 110 is user-authored by an administrator of software system 112 using XML, as discussed above. As a result, the administrator may easily specify organization-specific configuration standards using XML. One or more portions of compliance policy 110 may also be based on rules and regulations provided by outside parties such as vendors or government agencies. These rules and regulations may be translated into XML configuration standards by the administrator and similarly incorporated into compliance policy 110. Alternatively, XML-formatted configuration standards may be available on servers for the vendors, agencies, and/or other third parties. The configuration standards may be obtained from the servers and directly placed into compliance policy 110 without further formatting by the administrator. Consequently, the use of XML to describe compliance policy 110 may allow rules and regulations from multiple sources to be consolidated into a single document. Moreover, the document may easily be updated to reflect changes in software system 112 and/or associated rules and regulations.

If a violation is detected by configuration engine 104, the violation is passed to change recommendation engine 106, which may then use compliance policy 110 to generate a change recommendation associated with the violation. In other words, compliance policy 110 includes both tests for conformity to configuration standards and suggested solutions to detected violations of configuration standards. For example, the test in the above XML document includes SQL code that checks for advisories regarding critical patches. If any advisories exist, the test also retrieves a list of critical patches, which may be used to generate a change recommendation that suggests installing the critical patches. As with the configuration standards, the change recommendations may be added to compliance policy 110 by the administrator or another author of the XML document. For example, a web crawler may be used to obtain a list of security vulnerabilities and patches for software system 112 from one or more websites. The web crawler may then format the security vulnerabilities and patches into XML-based configuration standards that are included in compliance policy 110.

In one or more embodiments of the invention, change recommendations generated by change recommendation engine 106 are provided to the administrator of software system 112, who may use the change recommendations to resolve the violations. In one or more embodiments of the invention, change recommendation user interface (UI) 120 may be used to display change recommendations (e.g., change recommendation 1 122, change recommendation n 124) to the administrator. To apply the change recommendations, the administrator may manually retrieve suggested patches, change configuration file parameters, and/or perform other recommended changes to software system 112. Alternatively, the administrator may approve the change recommendations using change recommendation UI 120, and the change recommendations may be carried out using configuration framework 102 or another mechanism. As a result, the administrator may resolve violations of compliance policy 110 more efficiently using configuration framework 102 and change recommendation UI 120.

Figure 2:
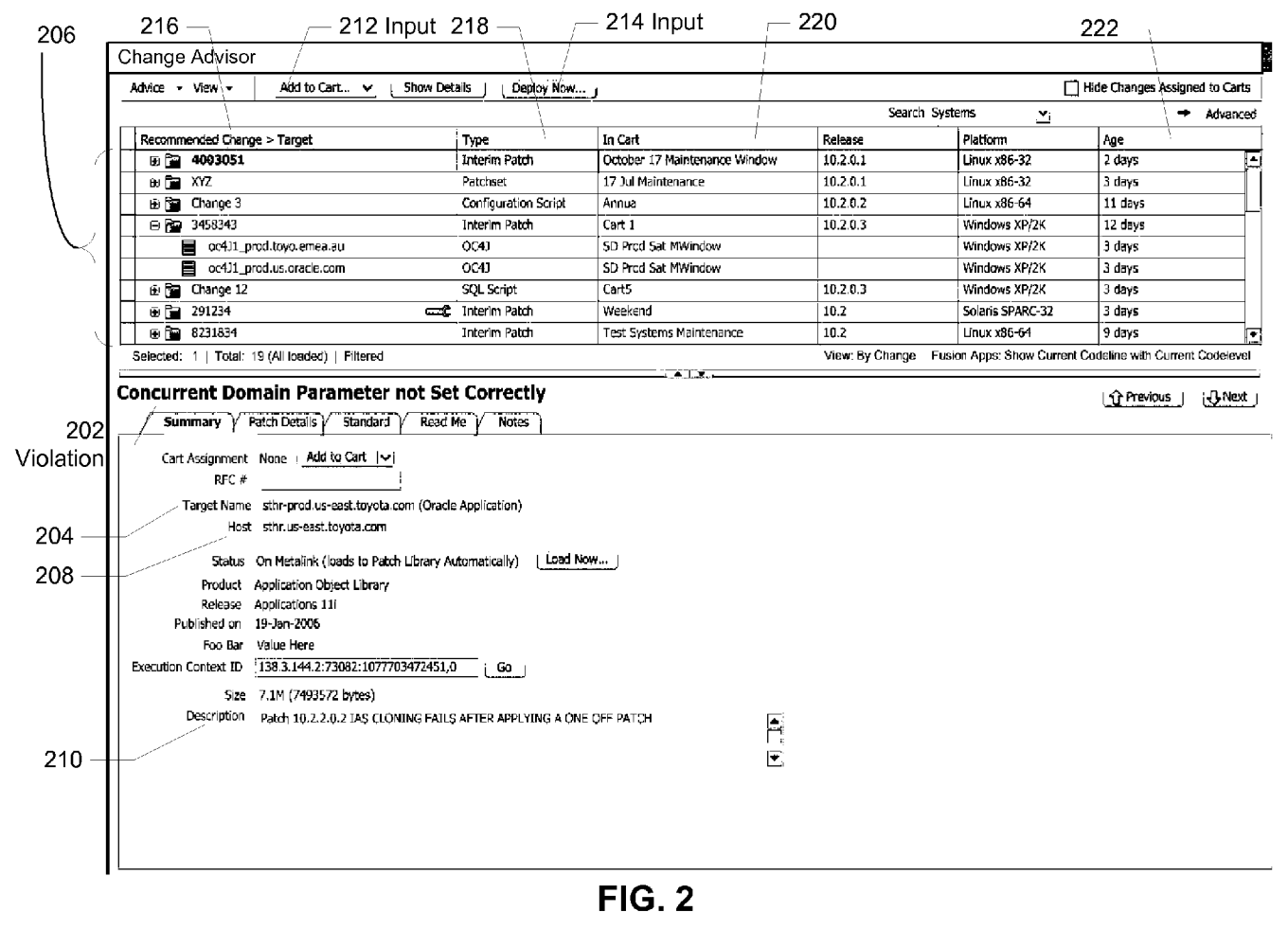

FIG. 2 shows an exemplary screenshot of a change recommendation UI in accordance with an embodiment of the present invention. The change recommendation UI may form part of a helpdesk application that is used by the administrator to maintain the software system. As described above, the change recommendation UI may be used to display a list of change recommendations 206 to an administrator of a software system, such as software system 112 of FIG. 1. Each of the change recommendations 206 may aid in the maintenance of the software system by facilitating the resolution of a corresponding compliance policy violation by software system 112. In one or more embodiments of the invention, compliance policy violations are associated with issues such as password resets, security attacks, opening and closing of ports, configuration file parameters, software patches, application types, application versions, and/or other standards.

As shown in FIG. 2, change recommendations 206 include information about targets 216 of the recommended changes. For example, a violation of a configuration standard related to a patch may be detected on multiple targets. As a result, a change recommendation for each target in violation of the configuration standard may be placed into a directory corresponding to the configuration standard. Each of the change recommendations 206 may also be associated with a type 218, such as "Interim Patch", "Configuration Script", or "SQL Script." Furthermore, each change recommendation may be placed into a cart 220, which may assign the violation and associated change recommendation to an area, group, and/or team for resolution of the violation. Finally, each change recommendation 206 may include age 222 information corresponding to the number of days the violation is listed and unresolved.

In addition, FIG. 2 shows a specific compliance policy violation 202 related to an incorrect setting of a concurrent domain parameter. The screenshot also displays the target name 204 and host 208 on which the violation is found, and a description 210 of the change recommendation for violation 202. To resolve the violation, the administrator may add the change recommendation to a cart using input 212, or the administrator may deploy the change recommendation immediately using input 214.

Figure 3:
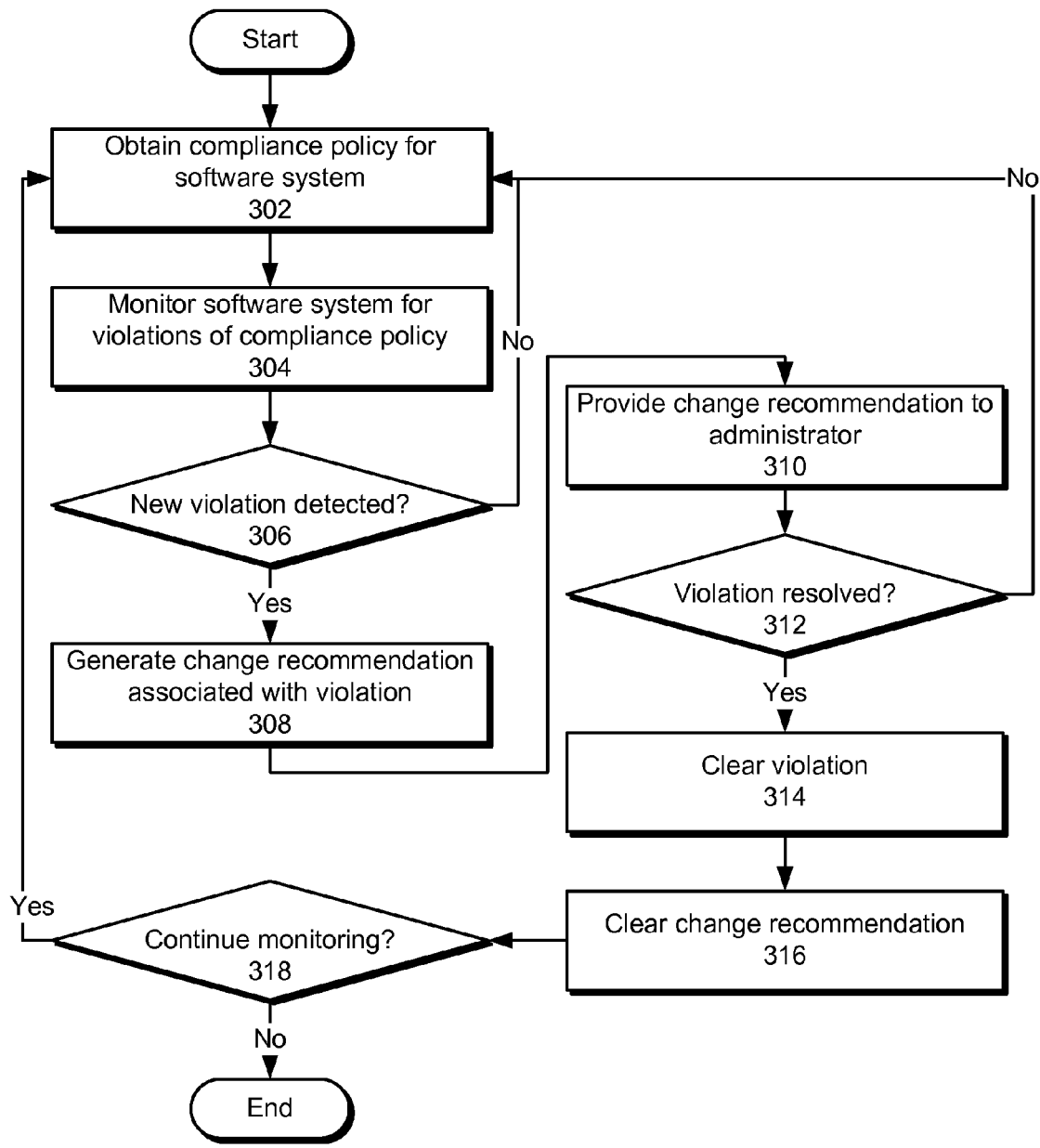
FIG. 3 shows a flowchart of software system maintenance in accordance with an embodiment of the present invention.

FIG. 3 shows a flowchart of software system maintenance in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a compliance policy is obtained for a software system (operation 302). The compliance policy may be authored by an administrator of the software system, obtained from a vendor of the software system, and/or issued by a regulatory agency. The compliance policy may also be formatted using XML to facilitate the collection of various policies and regulations into a single document. The use of XML may additionally enable changes in organizational, local, and/or vendor-specific rules and regulations to be incorporated easily into the compliance policy.

The software system is monitored for violations to the compliance policy (operation 304). Specifically, the compliance policy may include a set of configuration standards related to the enforcement of rules and regulations relevant to the software system. The software system is compared against each configuration standard to detect violations of the compliance policy (operation 306). If no new violations are detected, the compliance policy is periodically updated and the software system is continually monitored for violations to the compliance policy (operations 302-304).

If a new violation is detected, a change recommendation associated with the violation is generated (operation 308). The change recommendation may be stored in the compliance policy and retrieved when a violation of a specific configuration standard is found. For example, a configuration standard for a security vulnerability may include a test for the security vulnerability. If the security vulnerability is detected using the test, the configuration standard may include a patch for the security vulnerability. The change recommendation may be generated by looking up the patch using the configuration standard and including the patch in the change recommendation.

The change recommendation is provided to the administrator (operation 310) so that the administrator may use the change recommendation to resolve the violation (operation 312). To resolve the violation, the administrator may approve the change recommendation, which may be deployed on the software system. Alternatively, the administrator may assign the change recommendation to another group or team for deployment. If the violation is resolved, the violation is cleared (operation 314) and the change recommendation is cleared (operation 316). If the violation is not resolved, the change recommendation is displayed to the administrator until action is taken by the administrator to resolve the violation.

The software system may continue to be monitored (operation 318) using the compliance policy as long as the software system is in use. If new violations are detected, change recommendations are generated and provided to the administrator until the violations are resolved (operations 306-316). In addition, the compliance policy may be periodically updated (operation 302) to obtain configuration standards that reflect the most recent changes to rules and regulations for the software system.

Figure 4:
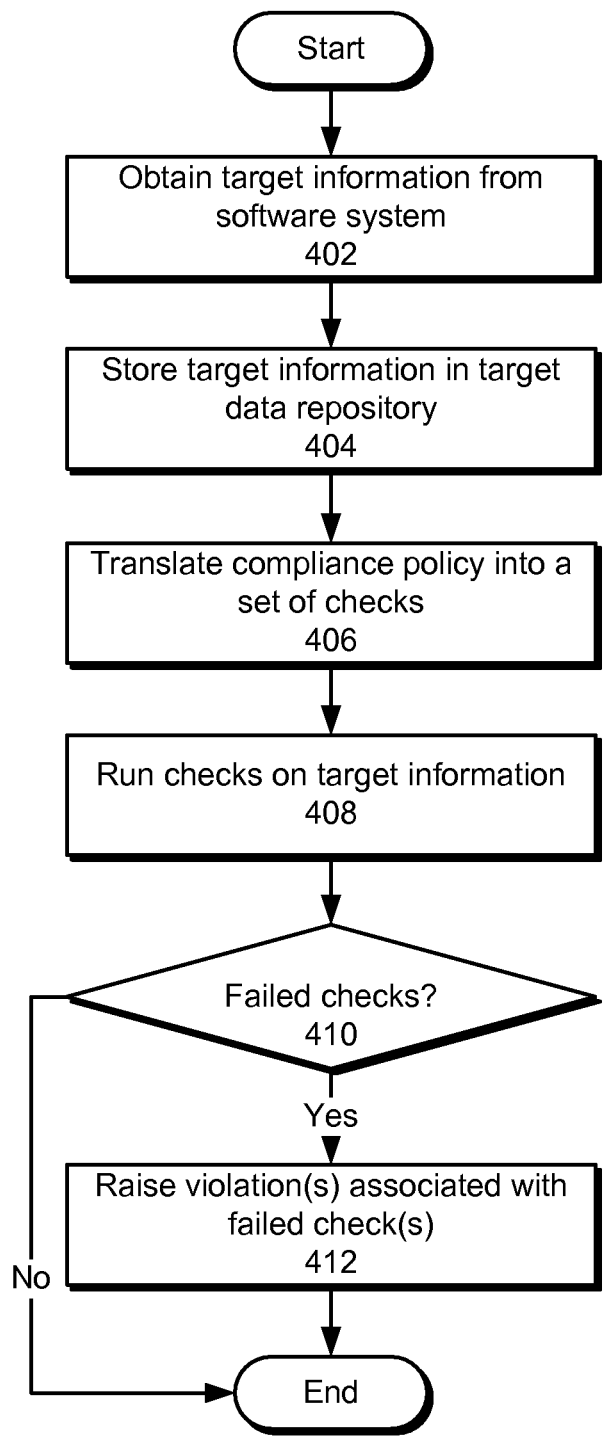
FIG. 4 shows a flowchart of software system monitoring in accordance with an embodiment of the present invention.

FIG. 4 shows a flowchart of software system monitoring in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, target information is obtained from the software system (operation 402). As described above, the software system may include multiple targets (e.g., databases, applications, operating systems, processes, etc.) executing in a distributed environment, such as a data center. The target information may include configuration parameters, open and closed ports, and/or other settings and operating data for each of the targets. The data may be obtained using one or more agent processes which serve as interfaces with the software system. The target information is then stored in a target data repository (operation 404).

The target information may be checked for violations of a compliance policy for the software system. To do so, the compliance policy is translated into a set of checks (operation 406), which are then run on the target information (operation 408). For example, the compliance policy may be an XML document that includes a set of configuration standards. Each configuration standard may include a set of XML tags and elements that provide a test of conformity to the configuration standard. The test may use a script, such as a SQL script, or another comparison tool to examine one or more data fields in the target data repository for conformity to the configuration standard. The XML file may be parsed to obtain the test, which may be executed to determine if the configuration standard is violated by the software system.

If any checks fail (operation 410), violations associated with the failed checks are raised (operation 412). The violations may then be resolved using change recommendations included in the compliance policy, as described above.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
    collecting information from a plurality of components of a software system;
    storing the collected information in a data repository;
    parsing a compliance policy for the software system to determine a compliance test that includes a predefined database query for the data repository, wherein the database query produces a result which indicates whether the software system is in compliance with a configuration requirement for the software system;
    determining whether the software system violates the compliance policy by performing the database query of the compliance test on the data repository;
    in response to determining that the software system violates the compliance policy:
        generating a change recommendation based on a suggested solution to the policy violation included in the compliance policy; and
        providing the change recommendation;

re-evaluating the software system using the compliance policy; and in response to determining that the software system conforms to the compliance policy, clearing both the violation and the change recommendation.

2. The method of claim 1, wherein the compliance policy is user-authored by the administrator.

3. The method of claim 1, wherein the violation is associated with at least one of a password reset, a security attack, a port, a configuration file, a software patch, an application type, an application version, and a standard.

4. The method of claim 1, wherein the software system is executed at multiple server computers within a data center.

5. The method of claim 1, wherein the change recommendation is provided to the administrator using a change recommendation user interface (UI).

6. The method of claim 1, wherein the compliance policy comprises an Extensible Markup Language (XML) document.

7. A system comprising:
   a processor;
   a memory;
   a data repository configured to store information collected from a plurality of components of a software system;
   a configuration framework configured to parse a compliance policy to determine a compliance test that includes a predefined database query, wherein the database query produces a result which indicates whether the software system is in compliance with a configuration requirement for the software system, and wherein the configuration framework comprises:
      a configuration engine configured to determine whether the software system violates the compliance policy by performing the database query of the compliance test on the data repository; and
      a change recommendation engine configured to generate a change recommendation for the violation associated with the compliance test using the compliance policy; and
   a change recommendation user interface (UI) configured to provide the change recommendation;
   wherein the configuration engine is further configured to re-evaluate the software system using the compliance policy, and
   wherein the change recommendation engine is further configured to clear both the violation and the change recommendation.

8. The system of claim 7, further comprising:
   an agent process configured to:
      obtain information from the software system; and
      store the information in the data repository,
   wherein the stored information is used by the configuration standard framework to determine whether the software system violates the compliance policy.

9. The system of claim 7, wherein the compliance policy is user-authored by the administrator.

10. The system of claim 7, wherein the violation is associated with at least one of a password reset, a security attack, a port, a configuration file, a software patch, an application type, an application version, and a standard.

11. The system of claim 7, wherein the software system is executed at multiple server computers within a data center.

12. The system of claim 7, wherein the compliance policy comprises an Extensible Markup Language (XML) document.

13. A non-transitory computer-readable storage medium storing instructions that when executed by a computer cause the computer to perform a method comprising:
   collecting information from a plurality of components of a software system;
   storing the collected information in a data repository;
   parsing a compliance policy for the software system to determine a compliance test that includes a predefined database query for the data repository, wherein the database query produces a result which indicates whether the software system is in compliance with a configuration requirement for the software system;
   determining whether the software system violates the compliance policy by performing the database query of the compliance test on the data repository;
   in response to determining that the software system violates the compliance policy:
      generating a change recommendation for the compliance test; and
      providing the change recommendation;
   re-evaluating the software system using the compliance policy; and in response to determining that the software system conforms to the compliance policy, clearing both the violation and the change recommendation.

14. The non-transitory computer-readable storage medium of claim 13, wherein the compliance policy is user-authored by the administrator.

15. The non-transitory computer-readable storage medium of claim 13, wherein the violation is associated with at least one of a password reset, a security attack, a port, a configuration file, a software patch, an application type, an application version, and a standard.

16. The non-transitory computer-readable storage medium of claim 13, wherein the software system is executed at multiple server computers within a data center.

17. The non-transitory computer-readable storage medium of claim 13, wherein the change recommendation is provided to the administrator using a change recommendation user interface (UI).

18. The non-transitory computer-readable storage medium of claim 13, wherein the compliance policy comprises an Extensible Markup Language (XML) document.

* * * * *